(12) United States Patent
Katayama

(10) Patent No.: US 7,379,090 B2
(45) Date of Patent: May 27, 2008

(54) IMAGE CAPTURE APPARATUS WITH VARIABLE IMAGE DATA TRANSFER RATE BASED ON OPERATING STATUS

(75) Inventor: Atsushi Katayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 733 days.

(21) Appl. No.: 10/457,422

(22) Filed: Jun. 10, 2003

(65) Prior Publication Data

US 2003/0234868 A1 Dec. 25, 2003

(30) Foreign Application Priority Data

Jun. 25, 2002 (JP) ............................. 2002-184467

(51) Int. Cl.
*H04N 5/225* (2006.01)
*H04N 9/04* (2006.01)
*H04N 5/222* (2006.01)

(52) U.S. Cl. .............................. 348/207.1; 348/207.11; 348/207.99; 348/333.13; 348/220.1

(58) Field of Classification Search ............ 348/207.1, 348/207.11, 718, 220.1, 333.13
See application file for complete search history.

(56) References Cited

U.S. PATENT DOCUMENTS

| | | | |
|---|---|---|---|
| 6,618,089 B1* | 9/2003 | Tamayama | 348/333.13 |
| 6,683,642 B1* | 1/2004 | Kobayashi et al. | 348/231.2 |
| 6,870,566 B1* | 3/2005 | Koide et al. | 348/296 |
| 6,882,361 B1* | 4/2005 | Gaylord | 348/207.1 |
| 2002/0051074 A1* | 5/2002 | Kawaoka et al. | 348/376 |
| 2002/0191080 A1* | 12/2002 | Terada et al. | 348/207.1 |

OTHER PUBLICATIONS

U.S. Appl. No. 10/314,286, filed Dec. 9, 2003, Endo et al.

* cited by examiner

*Primary Examiner*—Lin Ye
*Assistant Examiner*—Richard M Bemben
(74) *Attorney, Agent, or Firm*—Fitzpatrick, Cella, Harper & Scinto

(57) ABSTRACT

An image capture apparatus includes an image capture unit, an internal memory, a digital communication unit, a display unit and a control unit. The image capture unit captures an image. The internal memory stores the captured image. The digital communication unit sends the captured image stored in the internal memory to an external device. The control unit (i) selects a low-speed transfer mode if the display unit displays an image, and (ii) selects a high-speed transfer mode if the display unit does not display an image. Both the low-speed transfer mode and the high-speed transfer mode are used for transfer of data between the internal memory and the digital communication unit for transfer of the captured image to the external device.

8 Claims, 3 Drawing Sheets

IMAGE CAPTURE APPARATUS WITH VARIABLE IMAGE DATA TRANSFER RATE BASED ON OPERATING STATUS

BACKGROUND OF THE INVENTION

1. Field of the Invention

The present invention relates to an apparatus which generates still image data of an object.

2. Description of the Related Art

A known apparatus for generating still image data is a digital camera.

In a known digital camera, in processing for displaying display data (such as a frame of reduced image data of still image data generated by an image capture apparatus or read from a removable storage medium, or menu-panel data for illustrating a menu panel) on a display unit, when data to be written in an external apparatus is transferred from an internal memory to a digital interface unit or when data read from the external apparatus is transferred from the digital interface unit to the internal memory by a DMA (direct memory access) transfer, a display processing problem (for example, a delay in the display processing) is likely to occur, whereby the display data is sometimes displayed in an disarranged manner.

Also, in a known digital camera, in processing for continuously generating a plurality of frames of still image data (that is, in continuous capture processing), when data to be written in the external apparatus is transferred from the internal memory to the digital interface unit or when data read from the external apparatus is transferred from the digital interface unit to the internal memory by DMA transfer, a continuous capture processing problem (for example, a delay in photometric control processing, or in image processing) is likely to occur, whereby the frames of still image data are generated in an disarranged manner.

SUMMARY OF THE INVENTION

An object of the present invention is to overcome the above-described drawbacks.

Another object of the present invention is to provide an image capture apparatus which writes data in an external apparatus and reads out data from the external apparatus without causing a display processing problem or a continuous capture processing problem to occur.

An image capture apparatus according to a preferred embodiment of the present embodiment comprises storage means and digital communication means. A transfer mode between the storage means and the digital communication means is changed in accordance with an operating state of the image capture apparatus.

Still other objects, features and advantages of the present invention will become fully apparent from the following detailed description of the preferred embodiments with reference to the attached drawings.

DESCRIPTION OF THE PREFERRED EMBODIMENT

A preferred embodiment of the present invention will be described with reference to FIGS. 1 to 3.

Figure 1:
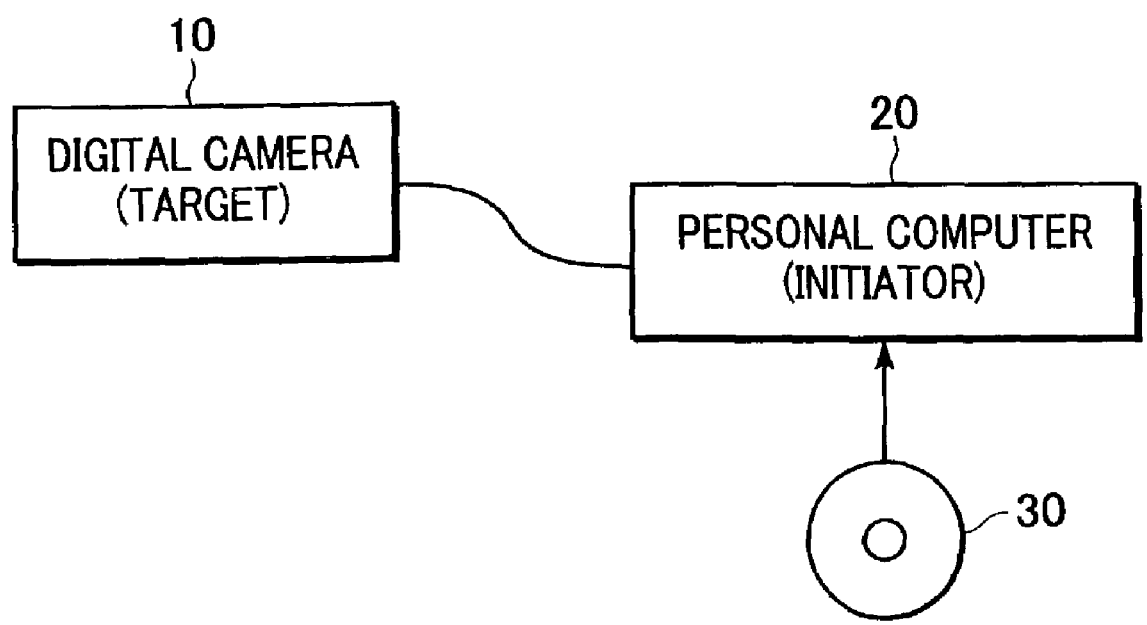
FIG. 1 illustrates an image capture system according to an embodiment of the present invention.

FIG. 1 is a block diagram illustrating an image capture system according to a preferred embodiment of the present invention.

A digital camera 10 is an image capture apparatus according to the present embodiment. The digital camera 10 has a drive mode in which still image data and corresponding additional data are generated (hereinafter, referred to as an single-frame capture mode), and another drive mode in which a plurality of frames of still image data and corresponding additional data are continuously generated at specified time intervals (hereinafter, referred to as a continuous capture mode). A PC (personal computer) 20 is a controller according to the present embodiment. A storage medium 30 stores a program for operating the digital camera 10 by remote control (hereinafter, referred to as a camera-control program).

The PC 20 installs the camera-control program from the storage medium 30 and controls the digital camera 10 in accordance with the installed camera-control program. When the PC 20 is to read data such as still image data from the digital camera 10, the PC 20 transmits a command block ORB (operation request block) including a READ (10) command to the digital camera 10. When the PC 20 is to write data such as set data in the digital camera 10, the PC 20 transmits the command block ORB including a WRITE (10) command to the digital camera 10. The command block ORB is one of the requests defined by SBP-2 (Serial Bus Protocol 2) and stores SCSI (small computer system interface) commands such as the READ (10) command and the WRITE (10) command. The SBP-2 is a communication protocol defined by ISO/IEC 14776-232.

Figure 2:
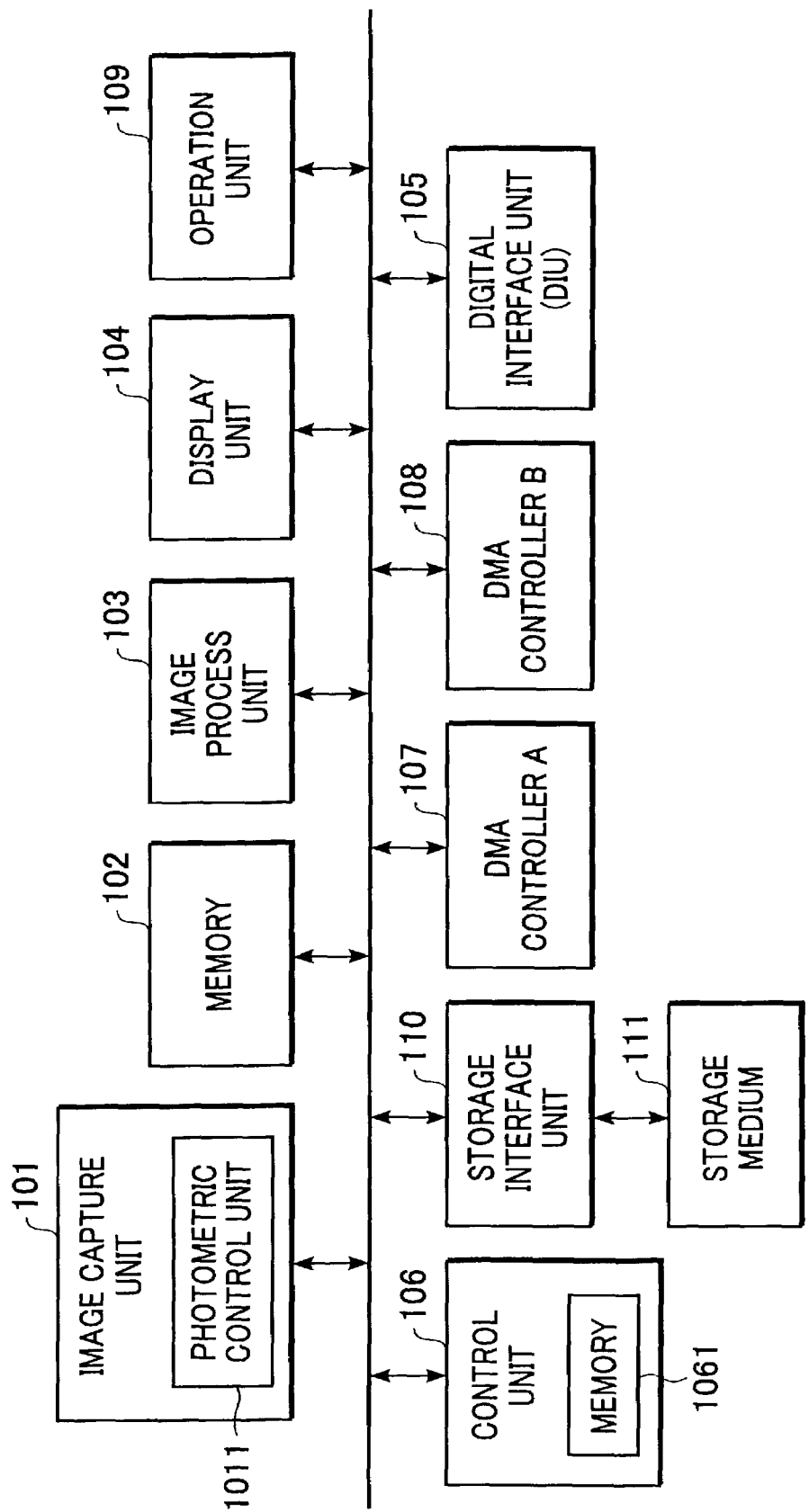
FIG. 2 illustrates the structure of a digital camera shown in FIG. 1.

Referring next to FIG. 2, the structure of the digital camera 10 according to the present embodiment will be described.

An image capture unit 101 is means for generating still image data of an object and corresponding additional data. When the digital camera 10 is in the single-frame capture mode, the image capture unit 101 generates a frame of still image data and corresponding additional data. This data is temporally stored in a memory 102. Meanwhile, when the digital camera 10 is in the continuous capture mode, the image capture unit 101 continuously generates still image data and corresponding additional data at specified time intervals. This data is also temporally stored in memory 102. A photometric control unit 1011 controls the photometric processing of the image capture unit 101 in accordance with one of a plurality of photometric modes. The photometric modes can be selected with a photometric mode button of an operation unit 109.

The memory 102 is high-speed, large-capacity storage means to which random access is permitted. The memory 102 temporally stores data for a predetermined number of still images obtained from the image capture unit 101 or a storage medium 111, the corresponding additional data, and reduced image data of the still image data. In addition, the memory 102 also stores menu-panel data to be displayed on a display unit 104. Moreover, the memory 102 also temporally stores data (such as still image data obtained from the image capture unit 101 or the storage medium 111 and the corresponding additional data) to be written in the PC 20 and data (such as set data used in an image process unit 103) read from the PC 20. Furthermore, the memory 102 can be used as a working area of a control unit 106.

A function of the image process unit 103 is to generate reduced image data from the still image data temporally stored in memory 102. Another function of the image process unit 103 is to tune at least one of the image quality, white balance, color balance, brightness, and sharpness of the still image data temporally stored in memory 102 in accordance with one of a plurality of set data stored in a memory 1061 of the control unit 106. Still another function of the image process unit 103 is to encode or decode the still image data temporally stored in memory 102 in accordance with a predetermined encoding or decoding system.

The display unit 104 is means for displaying display data, such as reduced image data of still image data picked up by the image capture unit 101 or read from the storage medium 111, or menu-panel data for illustrating a menu-panel.

A DIU (digital interface unit) 105 is digital communication means for controlling digital communications between the digital camera 10 and external units including the PC 20. The DIU 105 reads data requested by the PC 20 from the memory 102 and writes it in the PC 20. The DIU 105 is in conformity with at least one of a wire communication system, a wireless communication system, and an optical communication system. Accordingly, for example, the DIU 105 may be in conformity with standards about serial buses (such as USB (Universal Serial Bus) 1.1 or USB 2.0 in IEEE Std 1394-1995). In the present embodiment, for example, the DIU 105 is in conformity with IEEE Std 1394-1995 and its related standards. In addition, the DIU 105 supports the SBP-2 standard defined by ISO/IEC 14776-232.

The control unit 106 is means for controlling the functions provided in the digital camera 10. In particular, a function of the control unit 106 is to change a data transfer mode between the memory 102 and the DIU 105. Another function of the control unit 106 is to control PIO (programmed I/O) transfer between the memory 102 and the DIU 105, and this function works effectively when the memory 102 and the DIU 105 are mutually in a low-speed transfer mode. In the low-speed transfer mode, the control unit 106 transfers data to be written in the PC 20 from the memory 102 to the DIU 105 by DMA (direct memory access) transfer or transfers {an item of} data read from the PC 20 from the DIU 105 to the memory 102 by DMA transfer. Memory 1061 is storage means for storing a control program executable in the control unit 106. Memory 1061 also stores programs for controlling a process procedure, shown in FIG. 3, and the PIO transfer between the memory 102 and the DIU 105.

A DMA controller A 107 is means for controlling the DMA transfer between the memory 102 and the display unit 104 and is activated when display data is displayed on the display unit 104.

A DMA controller B 108 is means for controlling the DMA transfer between the memory 102 and the DIU 105 and is effective when the memory 102 and the DIU 105 are mutually in a high-speed transfer mode. In the high-speed transfer mode, the DMA controller B 108 transfers data to be written in the PC 20 from the memory 102 to the DIU 105 at high-speed by DMA transfer, or data read from the PC 20 from the DIU 105 to the memory 102 at high-speed by DMA transfer.

The operation unit 109 is means for inputting instructions of an operator. The operation unit 109 has manual operation buttons, such as a power switch for turning on or off the electric power of the digital camera 10, a shutter release button for instructing the generation of still image data, a drive mode button for selecting one of the plurality of drive modes (such as the single-frame capture mode and the continuous capture mode), a photometric mode button for selecting one of the plurality of photometric modes, a menu-button for calling up menu-panel data to the display unit 104, and a display button for displaying reduced image data of predetermined still image data on the display unit 104.

A storage interface unit 110 has two functions for writing still image data read from the memory 102 and the corresponding additional data in the storage medium 111, and for reading still image data selected by the control unit 106 and the corresponding additional data from the storage medium 111. The still image data read from the storage medium 111 and the corresponding additional data are temporally stored in memory 102. The storage medium 111 is removable.

Figure 3:
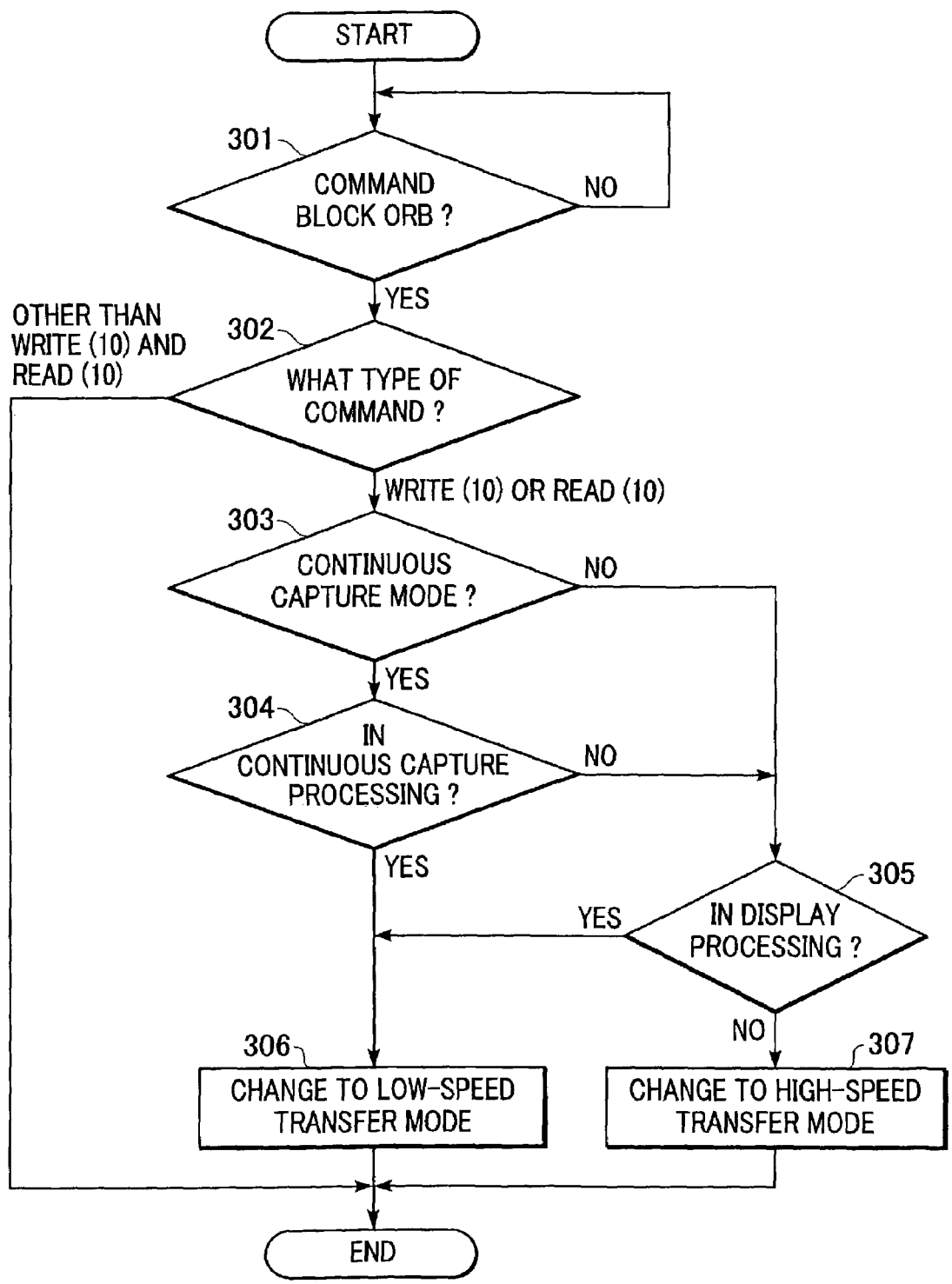
FIG. 3 illustrates an example process procedure for controlling a transfer mode between an upper memory and a digital interface unit (DIU) shown in FIG. 2.

Referring now to FIG. 3, an example of the process procedure for controlling the transfer mode between the memory 102 and the DIU 105 in accordance with an operating state of the digital camera 10 will be described. Whenever the digital camera 10 (target) receives a request from the PC 20 (initiator), the request is executed in accordance with the process procedure shown in FIG. 3.

In Step S301, the control unit 106 of the digital camera 10 (target) determines whether the request received from the PC 20 (initiator) is a command block ORB. If YES, a process in Step S302 starts.

In Step S302, the control unit 106 checks the command type written in the command block field of the command block ORB received from the PC 20. If the request is a command block ORB including the READ (10) command or the WRITE (10) command, a process in Step S303 starts.

In Step S303, the control unit 106 determines whether the digital camera 10 is in the continuous capture mode. If YES, a process in Step S304 starts. If NO, a process in Step S305 starts.

In Step S304, the control unit 106 determines whether the digital camera 10 is in continuous capture processing (in particular, in photometric control processing or in image processing). A plurality of frames of still image data and corresponding additional data are generated at specified time intervals by the foregoing continuous capture processing, which includes the photometric control processing and image processing. Photometric processing of the image capture unit 101 is controlled by the foregoing photometric control processing in accordance with one of the plurality of photometric modes. Also, at least one of the image quality, white balance, color balance, brightness, and sharpness of the still image data temporally stored in memory 102 is tuned by the foregoing image processing in accordance with one of the set data stored in the memory 1061. If YES, a process in Step S306 starts in order to prevent occurrence of a continuous capture processing problem (for example, a delay in the photometric control processing or in the image processing). If NO, a process in Step S305 starts.

In Step S305, the control unit 106 determines whether the digital camera 10 is in display processing. Display data, such as reduced image data of still image data picked up by the image capture unit 101 or read from the storage medium 111, or menu-panel data for illustrating a menu panel, is displayed on the display unit 104 by the foregoing display processing. If YES, a process in Step S306 starts in order to prevent occurrence of a display processing problem (for example, a delay in the display processing). If NO, a process in Step S307 starts in order to execute a high-speed data transfer.

In Step S306, the control unit 106 changes the transfer mode between the memory 102 and the DIU 105 to the low-speed transfer mode (also referred to as PIO transfer mode). Once the transfer mode has been changed to the low-speed transfer mode, data transfer between the memory 102 and the DIU 105 is appropriately controlled by the control unit 106 so as to prevent occurrence of a display processing problem and a continuous capture processing problem. As a result, data (such as still image data obtained from the image capture unit 101 or the storage medium 111 and the corresponding additional data) requested by the command block ORB including the READ (10) command are transferred at low speed by the PIO transfer from the memory 102 to the DIU 105, and are then written in the PC 20. Also, data (such as the set data used in the image process unit 103) requested by the command block ORB including the WRITE (10) command is read from the PC 20 and is then transferred at low speed by the PIO transfer from the DIU 105 to the memory 102.

In Step S307, the control unit 106 changes the transfer mode between the memory 102 and the DIU 105 to the high-speed transfer mode (also referred to as DMA transfer mode). Once the transfer mode has been changed to the high-speed transfer mode, data transfer between the memory 102 and the DIU 105 is controlled by the DMA controller B 108. As a result, data (such as still image data obtained from the image capture unit 101, or the storage medium 111, and the corresponding additional data) requested by the command block ORB including the READ (10) command is transferred at high speed by DMA transfer from the memory 102 to the DIU 105, and is then written in the PC 20. Also, data (such as the set data used in the image process unit 103) requested by the command block ORB including the WRITE (10) command is read from the PC 20, and is then transferred at high speed by DMA transfer from the DIU 105 to the memory 102.

As described above, with the digital camera 10 according to the present embodiment, since the transfer mode between the memory 102 and the DIU 105 can be changed between a low-speed transfer mode and a high-speed transfer mode in accordance with the operating state of the digital camera 10, data requested by a command block ORB including the READ (10) command or the WRITE (10) command is respectively written in or read from the PC 20, without causing a display processing problem.

Also, with the digital camera 10 according to the present embodiment, since the transfer mode between the memory 102 and the DIU 105 can be changed between the low-speed transfer mode and the high-speed transfer mode in accordance with the operating state of the digital camera 10, data requested by a command block ORB including the READ (10) command or the WRITE (10) command is respectively written in or read from the PC 20, without causing a continuous capture processing problem (in particular, a photometric control processing problem and an image processing problem).

In addition, with the digital camera 10 according to the present embodiment, when the digital camera 10 is neither in display processing nor in the continuous capture processing, data transfer between the memory 102 and the DIU 105 can be executed at high speed, thereby improving the process speed of the image capture system.

The above-described preferred embodiment is merely exemplary of the present invention and should not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

What is claimed is:

1. An image capture apparatus comprising:
   an image capture unit adapted to capture an image;
   an internal memory adapted to store the captured image;
   a digital communication unit adapted to send the captured image stored in the internal memory to an external device;
   a display unit adapted to display an image; and
   a control unit adapted to (i) select a low-speed transfer mode if the display unit displays an image, and (ii) select a high-speed transfer mode if the display unit does not display an image, both the low-speed transfer mode and the high-speed transfer mode being used for transfer of data between the internal memory and the digital communication unit for transfer of the captured image to the external device.

2. The image capture apparatus according to claim 1, wherein the control unit selects the low-speed transfer mode if the image capture apparatus is effecting a continuous image capture process.

3. The image capture apparatus according to claim 1, further comprising:
   at least one direct memory access (DMA) controller,
   wherein data transfer between the internal memory and the digital communication unit is controlled by the DMA controller, if the high speed transfer mode is selected.

4. The image capture apparatus according to claim 3, wherein data transfer between the internal memory and the digital communication unit is controlled without using the DMA controller, if the low speed transfer mode is selected.

5. A method of controlling an image capture apparatus, the image capture apparatus including (a) an image capture unit adapted to capture an image, (b) an internal memory adapted to store the captured image, (c) a digital communication unit adapted to send the captured image stored in the internal memory to an external device, and (d) a display unit adapted to display an image, the method comprising the steps of:
   selecting a low-speed transfer mode if the display unit displays an image; and
   selecting a high-speed transfer mode if the display unit does not display an image,
   wherein both the low-speed transfer mode and the high-speed transfer mode are used for transfer of data between the internal memory and the digital communication unit for transfer of the captured image to the external device.

6. The method according to claim 5, further comprising the step of:
   controlling data transfer between the internal memory and the digital communication unit by at least one direct memory access (DMA) controller, if the high-speed transfer mode is selected.

7. The method according to claim 6, further comprising the step of:
   controlling data transfer between the internal memory and the digital communication unit without using the DMA controller, if the low-speed transfer mode is selected.

8. The method according claim 5, further comprising the step of:
   selecting the low-speed transfer mode if the image capture apparatus is effecting a continuous image capture process.

* * * * *